United States Patent [19]

Rosier

[11] Patent Number: 4,989,442

[45] Date of Patent: Feb. 5, 1991

[54] NOSE ASSEMBLY FOR PULLING FASTENERS THROUGH INTERFERENCE FIT HOLES

[75] Inventor: Hendrik E. Rosier, Kingston, N.Y.

[73] Assignee: Huck Manufacturing Company, Irvine, Calif.

[21] Appl. No.: 430,912

[22] Filed: Oct. 30, 1989

Related U.S. Application Data

[63] Continuation of Ser. No. 259,938, Oct. 19, 1988, abandoned.

[51] Int. Cl.$^5$ ............................................. B21J 15/18
[52] U.S. Cl. ................................ 72/391.2; 72/453.17; 29/243.53
[58] Field of Search .................... 72/114, 391, 453.17; 29/243.53

[56] References Cited

U.S. PATENT DOCUMENTS

| | | | |
|---|---|---|---|
| 3,363,445 | 1/1968 | Sanders et al. | 72/391 |
| 3,406,557 | 10/1968 | Harris | 72/391 |
| 3,423,986 | 1/1969 | Young | 72/391 |
| 4,063,443 | 12/1977 | Yarbrough | 72/391 |
| 4,275,582 | 6/1981 | Sheffield | 72/391 |
| 4,704,888 | 11/1987 | Frearson | 72/391 |

*Primary Examiner*—David Jones
*Attorney, Agent, or Firm*—Lawrence J. Shurupoff

[57] ABSTRACT

A nose assembly for pulling fasteners through a workpiece includes an anvil having a conical surface for engaging a complimentary conical surface defined by a set of chuck jaws. The chuck jaws includes a rear skirted portion defining a recess for receiving a biased support member which prevents the radial collapse of the chuck jaws during actuation of the nose assembly. The nose assembly is particularly adapted for gripping a relatively short axially projecting portion of a fastener while ensuring complete engagement of all jaw teeth with the fastener.

4 Claims, 3 Drawing Sheets

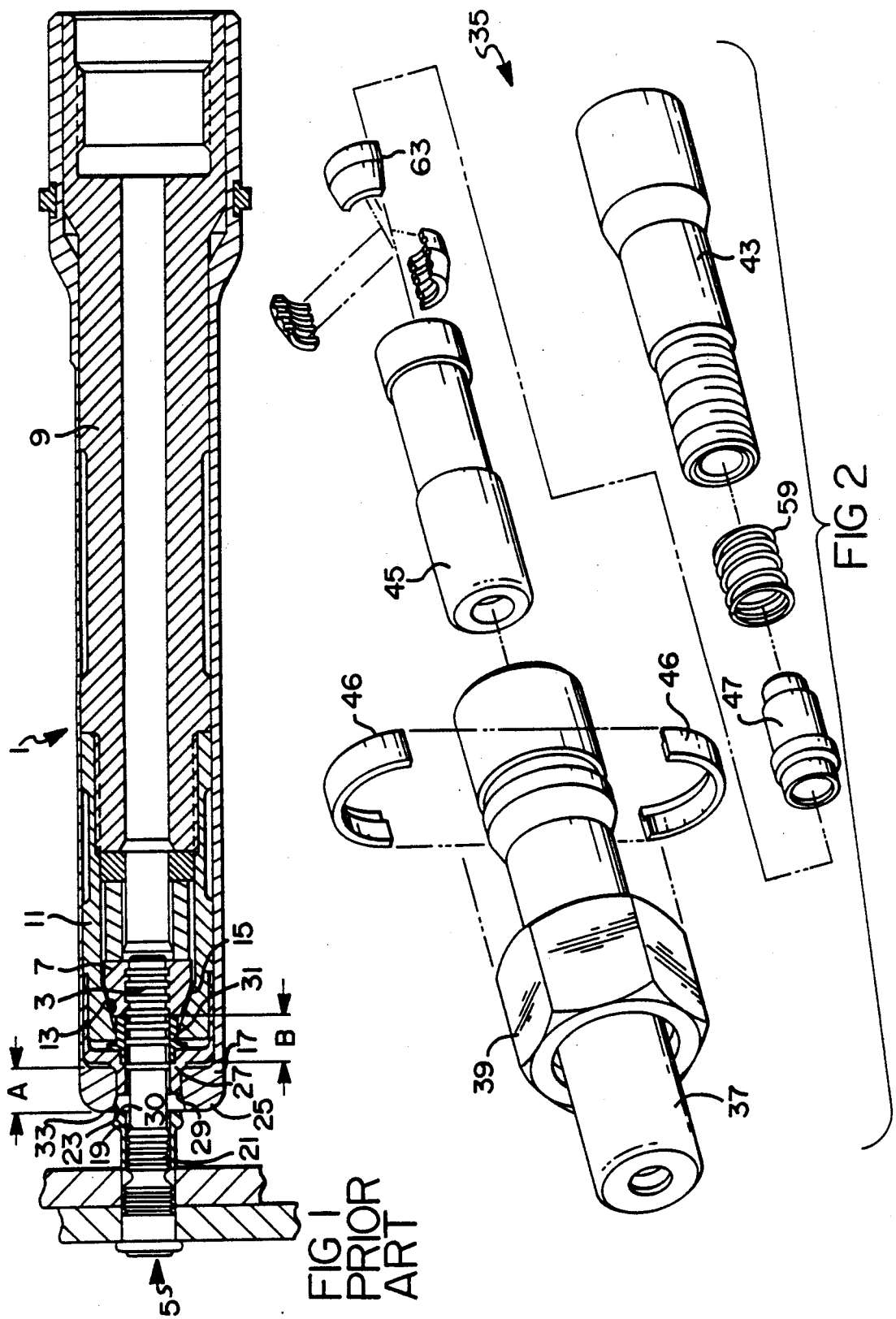

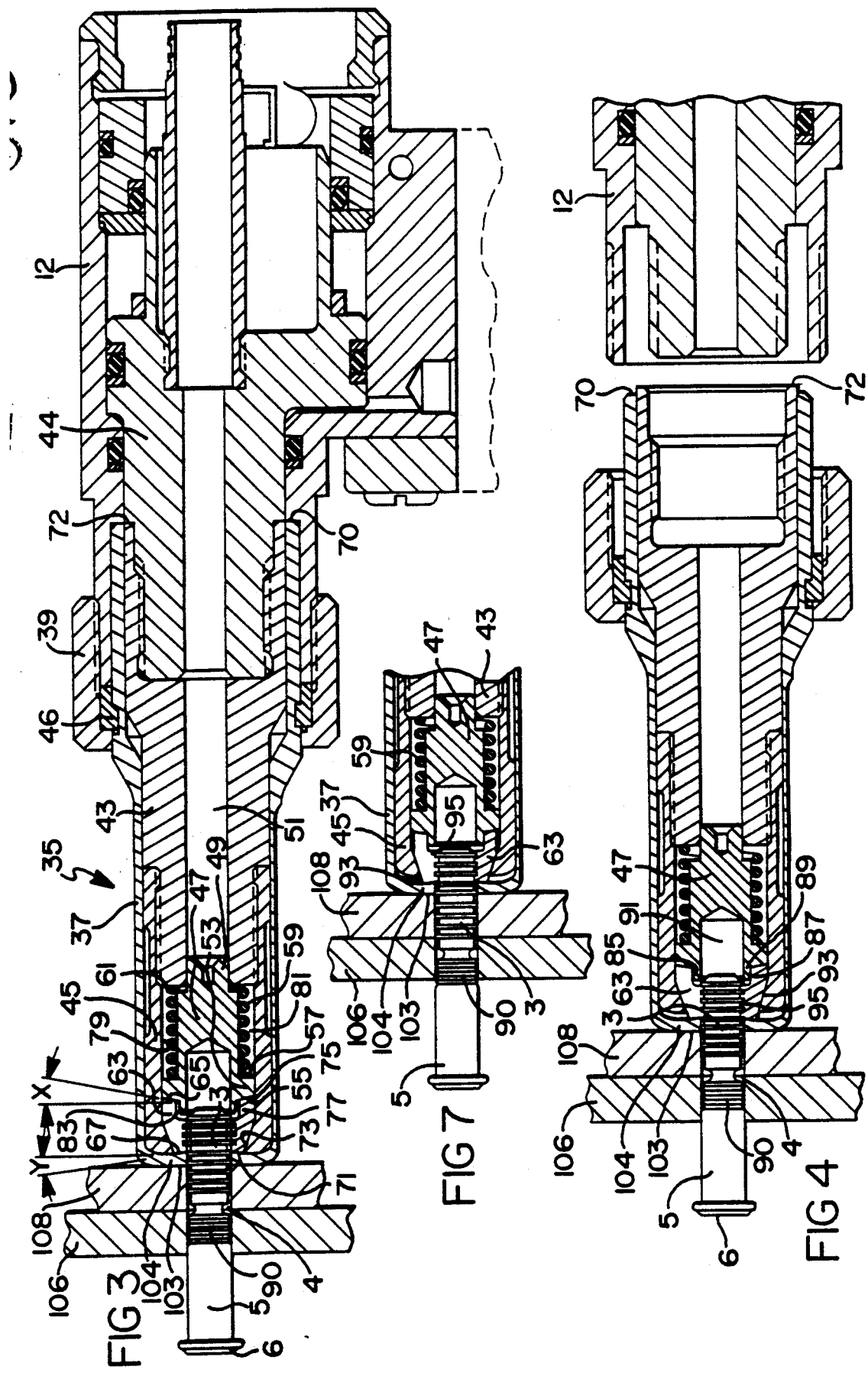

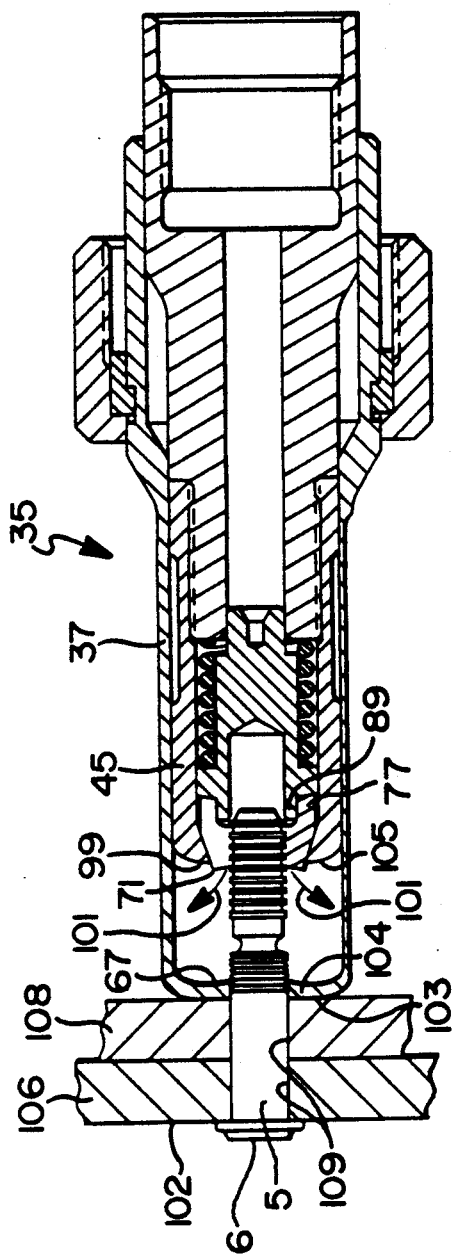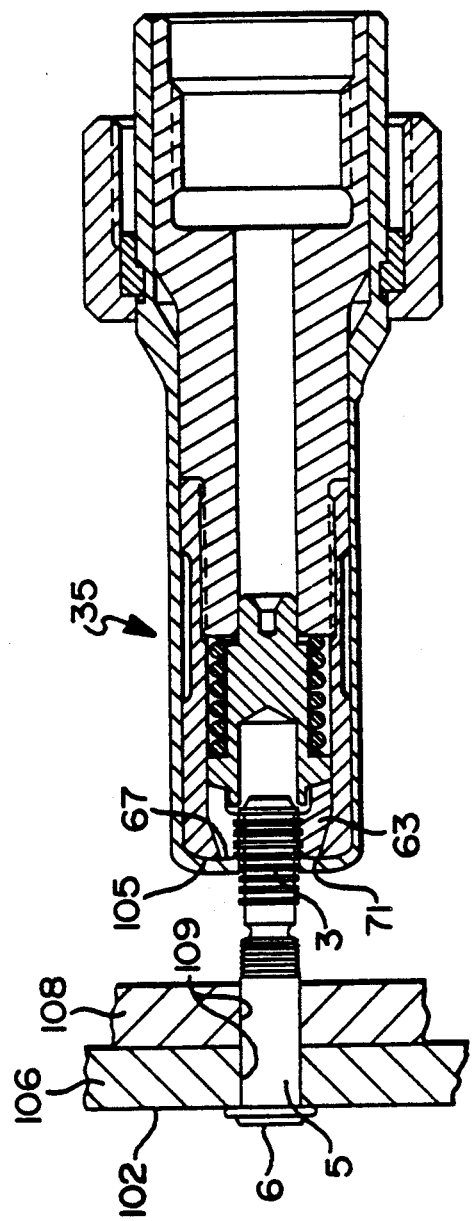

NOSE ASSEMBLY FOR PULLING FASTENERS THROUGH INTERFERENCE FIT HOLES

This application is a continuation of application Ser. No. 259,938, filed Oct. 19, 1988, now abandoned.

BACKGROUND OF THE INVENTION

1. Field of the Invention

This invention relates generally to an apparatus for pulling fastener pins through a workpiece and particularly relates to a nose assembly having a set of internally-supported spring-biased jaws for engaging a series of pull grooves formed on the fastener pins.

2. Description of Prior Developments

Pin and collar fasteners of the lock bolt variety are commonly used to fabricate various frames and structures including aircraft wings and aircraft cabins. It is often desirable to produce an interference fit between the body of the pin and the members being fastened in order to produce a fatigue resistant joint by cold working the material surrounding the pin. This is particularly advantageous in the case of a fabrication requiring a leak-tight assembly such as an aircraft wing which also serves as a fuel tank, or an aircraft cabin which is subject to pressurization. While an interference fit can be clearly desirable in numerous applications, there has been a most undesirable problem associated with the use of an interference fit between a fastener pin and its surrounding structure.

In order to produce such an interference fit, it has been necessary to use a hammer or an air impact tool to force the fastener pin through a hole formed through each member being fastened. This hammering has resulted in excessive noise levels reaching up to 120 decibels. Hammering poses a threat to hearing and requires the use of ear protection. Another drawback associated with such hammering is that it often damages the head of the fastener pin and/or the members being fastened.

Setting fasteners by conventional techniques requires one assembler to initially position the pin through one exposed side of the workpiece and subsequently hammer the pin therethrough while a second assembly worker applies reinforcing support to the opposite side of the workpiece via a bucking bar. Thus, two workers are needed to carry out this labor intensive task using conventional methods.

Prior to the present invention, no tool was available which could adequately grip the relatively short axial length of the fastener pin which projected through the members or workpieces being fastened. That is, a portion of the end of the fastener pin opposite its head is typically of reduced radial section to allow that section of the pin to be freely inserted through the members being fastened. This exposes a short axial portion of the fastener prior to reaching the point of interference between a radially enlarged portion of the pin shank and the opposite or back face of the structure being fastened.

Of course, it is possible to make the non-interference fit portion of the fastener pin longer to provide a longer gripping surface. However, this results in considerable expense and material waste since this portion, which is commonly known as a pintail, is broken off and discarded when a collar or nut is subsequently swaged or fastened over the pin. This poses a particular problem in aircraft applications since the material used for the fastener pins in such applications is frequently titanium which is quite expensive.

Moreover, it is often not possible to use long fastener pins due to space limitations which prevent a fastener tool from accessing the elongated fastener pins. This is particularly true in the case of aircraft applications where structural channel members known as "J stringers" prevent the fastener tool from reaching and engaging those fastener pins located within the Jstringer channels.

Accordingly, a need exists for a reliable nose assembly for use with a low noise level tool capable of gripping a short axial length of a fastener pin and quietly and smoothly pulling the fastener pin through an interference fit hole without damaging the fastener pin or the workpieces being fastened.

SUMMARY OF THE INVENTION

The present invention has been developed to meet the needs noted above and therefore has as a primary object the provision of a nose assembly adapted for use with a pneumatic or hydraulic tool for pulling fasteners through an interference fit while generating negligible levels of noise. In order to securely grip the typically short axial length of the fastener which projects through an interference hole, the nose assembly of the present invention is provided with a set of gripping jaws which are adapted to project axially outwardly from within a collet member as an axial pulling force is applied to the pin.

Because the jaws are adapted to project from the collet and thereby lose the support they would otherwise receive if completely nested within the collet, they must be provided with extra radial support. This extra support prevents the jaws from being damaged or pulled completely out of the collet as they pull a fastener pin through an interference fit within a bore or hole. Extra radial support is obtained by providing a recess in the rear of the jaws and fitting a support member or jaw follower within the recess to prevent the rear portion of the jaws from radially collapsing under the applied loads.

In order to radially expand and contract the jaws to respectively release and grip the fastener, the jaws, anvil and jaw follower are provided with complimentary conical surfaces to create a radially directed wedge-like camming action. A biasing member such as a compression spring maintains a constant axial force on the jaw follower which in turn transfers this force to the jaws to ensure that the jaws are advanced axially forwardly within the collet prior to gripping the fastener. This design guarantees the greatest axial engagement possible between the jaws and the fastener prior to tool actuation and maintains axially biased contact between the jaw follower and jaws. This contact is required to provide radial support to the rear portions of the jaws to counter the bending moments created at the front of the jaws thereby improving the reliability of the nosepiece.

The presence of a fastener within the jaws prevents the jaws from radially collapsing. Should the jaws radially collapse, they could be pulled completely out of the collet or otherwise damaged. This is a particularly common occurrence with prior nosepieces when only a short length of fastener is accessible. Moreover, the greater the axial length of engagement between the fastener and the jaws, the less will be the extent of non-engaged and unsupported jaw teeth.

The present invention eliminates a release or ejector assembly commonly used in prior nosepiece designs in order to axially advance the jaws as far forward as possible to provide the maximum amount of axial engagement between the jaws and the fastener. In this manner, the jaws can receive the maximum radial support available from the fastener and promote full engagement between the jaw teeth and fastener. However, since the jaws project forwardly from the collet to allow them to engage as much of the fastener as possible, the jaws are provided additional support from a jaw follower to prevent their radial collapse about their rear skirted portions.

By axially biasing the jaws within the collet, the probability of complete engagement of all jaw teeth with the fastener is increased under normal assembly conditions. If less than all jaw teeth engage the fastener, those teeth which are engaged are required to carry the entire pulling load thereby increasing the actual load on each engaged jaw tooth. Engagement of only one or two jaw teeth generates a radial twisting action or bending moment about the tip of the jaws and tends to pull the jaws radially outwardly from the collet. This condition, which is avoided by the present invention, can result in bent or deformed jaw teeth and jaws.

BRIEF DESCRIPTION OF THE DRAWINGS

Various other objects, features and attendant advantages of the present invention will be more fully appreciated as the same becomes better understood from the following detailed description when considered in connection with the accompanying drawings wherein:

FIG. 1 is an axial cross section view through a prior art nose assembly used to swage collar members over fastener pins;

FIG. 2 is an exploded perspective view of a nose assembly according to the present invention;

FIG. 3 is an axial cross section view through a nose assembly according to the present invention as mounted to a tool;

FIGS. 4-6 are axial cross section views of the nose assembly of FIG. 3 shown in various sequential stages of operation; and FIG. 7 is a fragmental sectional view showing partial engagement of the chuck jaws with a fastener member.

DETAILED DESCRIPTION OF THE PREFERRED EMBODIMENTS

In order to better appreciate the merits of the present invention, a brief review of a prior art nose assembly such as shown in FIG. 1 may be useful. Nose assembly 1 is adapted for use with pin and collar type fasteners of the lock bolt variety wherein a cylindrical collar is swaged into axially spaced annular grooves formed along the shank of a fastener pin. Swaging is carried out by engaging a pintail 3 of a fastener pin 5 within chuck jaws 7 and applying an axial reward force through spindle 9 and collet 11. Axial pulling and ejecting forces may be provided with a conventional reciprocating pneumatic tool 12 such as shown in fragment in FIG. 3.

As collet 11 is pulled rearwardly, its conical camming surface 13 engages the conical outer contour 15 of the chuck jaws 7 thereby causing the chuck jaws to radially contract and engage the grooves and ridges of the pintail 3. As the collet 11 continues rearwardly, the chuck jaws 7 axially pull the pintail 3 rearwardly causing the anvil 17 to engage the collar 19 with a reactionary force and swage the collar into the grooves 21 on the pin 5.

In order to perform the swaging, the anvil 17 must be formed with an axially extending contoured swaging surface 23 which radially squeezes and deforms the collar 19 into the grooves 21 in the pin 5. Because of the high forces generated during this swaging operation, swaging surface 23 must be reinforced with relatively thick and massive anvil material sections 25. Anvil sections 25 extend over a significant axial distance A thereby requiring the pintail 3 to axially extend within the nose assembly over this distance before engaging the chuck jaws 7.

In order to free the nose assembly after swaging, a release ejector assembly 27 is located between and partially within the collet 11 and anvil 17. A press-fit tubular spacer 31 forming a portion of the release ejector 27 displaces the jaws axially rearwardly within the collet 11. Release is achieved by driving the collet 11 forwardly causing the annular leading edge 29 of ejector 27 to contact the axial end face 30 of swaged collar 19 and push the nose assembly 1 away from the collar thereby freeing surface 23 from tight frictional engagement with the collar.

It can be seen that the chuck jaws 7 are axially spaced or recessed within the nose assembly a considerable distance from the end face 33 of the anvil. This spacing is equal to the sum of the axial length A of the anvil 17 and the axial length B of the release ejector 27 which includes the full axial length of the spacer 31.

While this spacing is acceptable for use with relatively long pintails, the axial spacing of A+B is too great to permit engagement of the chuck jaws with the relatively short pintails associated with aircraft fabrications. Short pintails are typically associated with fasteners designed and specified for minimizing material waste and material cost, for reducing material weight and for facilitating their access by increasing the clearance available for installation tooling. In order to access and engage the limited available gripping length of the pintail designed for such applications, the nose assembly of FIGS. 2-7 has been developed according to the present invention.

As seen in FIGS. 2 and 3, nose assembly 35 includes an anvil housing 37 adapted to be mounted on the end of pneumatic assembly tool 12 via threaded retaining nut 39. An internally threaded spindle 43 is adapted to be threaded to the end of tool piston 44 for powered linear reciprocating movement. A split ring 46 accurately positions and spaces the anvil housing 37 on the tool.

A collet 45 is threaded to the forward end of the spindle 43 to receive the axially directed actuating force from the tool piston. A jaw follower member 47 includes a rearwardly projecting locating boss 49 which coaxially nests within a central longitudinal bore 51 formed through the spindle 43. The jaw follower 47 further includes a radially projecting flange 53 having a front face 55 and a rear face 57.

A biasing element such as compression spring 59 is coaxially mounted over the cylindrical body portion of the jaw follower 47 and is bounded between the rear face 57 of flange 53 and the front end face 61 of the spindle. Spring 59 applies an axial force to the jaw follower 47 which in turn transfers this force to the three-piece circumferentially-segmented chuck jaws 63 via the front face 55 of flange 53.

Complimentary conical surfaces are formed on the rear face 65 of each chuck jaw segment and the front face 55 of flange 53. Conical front face 55 projects within a conical recess defined by the rear faces 65 of each chuck jaw segment. Most essential are the complimentary conical surfaces formed on the interior face 67 of anvil 69 and the front face 71 of each jaw segment 63. These complimentary surfaces 67, 71 are required for effecting a consistent release of the jaws from the fastener. Surfaces 55 and 65 further aid in the camming action. By forming surface 67 on the interior face of the anvil and surface 71 on the front face of each jaw segment, the release ejector assembly 27 of FIG. 1 may be eliminated.

The cone angle X between faces 55 and 65 and the cone angle Y between faces 67 and 71 are each fixed at approximately 10 degrees. However, angle X is directed axially rearwardly from a pure radial direction while angle Y is directed axially forwardly from a pure radial direction. This arrangement provides for a radially outwardly camming action upon each chuck jaw segment 63. The camming action is generated between faces 55 and 65 as well as faces 67 and 71 when an axial "squeezing" force is applied via flange 53 of jaw follower 47.

The force for this camming action is provided upon assembly of the nosepiece to the tool. In FIG. 4, the anvil housing and spindle are represented in their relative positions under which spring 59 is in its uncompressed configuration. As seen in FIG. 3, before tool actuation, the rear end face 70 of the anvil housing 37 is aligned in the same radial plane as the end face 72 of spindle 43. This alignment results in the compression spring 59 and the application of an axial pinching of the jaws. This pinching causes the jaws 63 to cam radially outwardly to freely receive a fastener. The amount of spring compression achieved during assembly can be seen by the difference in axial alignment between end faces 70 and 72 as shown in FIG. 4.

The operation of the nose assembly may be better appreciated from the actuation sequence shown in FIGS. 3-6. The nose assembly shown in FIG. 3 is in an unactuated or power-off condition such as occurs just before air or hydraulic power is applied to the tool to pull the spindle, collet, jaw follower, spring and chuck jaws axially rearwardly. In this free state, each chuck jaw segment 63 is nested virtually completely within the interior conical portion 73 of collet 45.

In this position, the front face 71 of each chuck jaw segment 63 is maintained in abutment with interior face 67 of anvil 37 by mounting the nose assembly to the tool. This mounting compresses spring 59 as discussed above and a radially outwardly wedging action is thus applied to each chuck jaw segment thereby maintaining the chuck jaws in the "open" or radially expanded or spread apart state shown in FIG. 3.

When the chuck jaws are biased open in the at rest condition in FIG. 3, the radial outer surface 75 of the rear tubular skirted portion 77 of each chuck segment 63 is wedged radially outwardly to contact the inner wall 79 of the cylindrical bore 81 formed within collet 45. This increases the clearance within the chuck jaws by an amount sufficient to allow the chuck jaws to be freely positioned over the fastener pintail 3. The amount of radial movement of the chuck jaws is set by the amount of radial clearance 83 (FIG. 3) provided between the inner cylindrical wall 85 (FIG. 4) of skirt 77 and the outer wall 87 of cylindrical boss 89.

A cavity 91 (FIG. 4) is formed in the front of follower 47 to allow full penetration of the pintail 3 within the chuck jaws 63. The cavity 91 is deep enough to allow the full length of the pintail to be received therein, yet is shallow enough to prevent any engagement of the jaws with the locking grooves 90. After the nose assembly 35 has been freely positioned over the pintail as shown in FIG. 3, power is applied by the tool 12 to axially retract the spindle 43 and collet 45.

During an initial portion of collet retraction (as shown in FIG. 4 with the tool being removed for clarity), the chuck jaws 63, follower 47 and the front face of the compression spring 59 remain virtually axially fixed in place although a small amount of movement is experienced by the chuck jaw segments 63 as they are cammed axially rearwardly via sliding contact between conical surfaces 67 and 71. This initial retraction causes each chuck jaw segment 63 to be wedged or cammed radially inwardly over the extent of radial clearance 83. This movement is caused by the radial force applied to the chuck jaws via the camming action created by sliding contact between the conical inner surface 73 of the collet and the conical outer surface 93 of each chuck jaw segment 63.

The initial retraction of the collet forces the chuck jaw segments 63 into firm engagement with each mating ridge and groove formed on the pintail 3 as further shown in FIG. 4. Engagement of each jaw tooth 95 with the pintail 3 provides radial support to the chuck jaws 63. Additional radial support is provided by contact between inner wall 85 of jaw skirt 77 and the outer cylindrical wall 87 of follower boss 89.

Once this contact is made between the follower boss 89 and the jaw skirt 77, the chuck jaws 63 begin to axially pull the fastener pin 5 through the interference fit hole 4. As the pin 5 is pulled through the hole 4 the chuck jaws 63 experience a bending moment applied around the inner front edge 99 of the collet 45 (FIG. 5). This bending moment is accompanied by a force which tends to pull the chuck jaw segments out of the front of collet 45, as represented by arrows 101. This moment and force are countered by the radial support provided between boss 89 and jaw skirt 77.

If less than all jaw teeth 95 are engaged with the pintail as shown in FIG. 7, the likelihood of the jaws being pulled out of the collet is increased. Thus, by locating the chuck jaw teeth as close as possible to the front face 103 of the anvil 104, full engagement of each tooth is ensured, thereby minimizing the chance of pulling the chuck jaws out of the collet. Moreover, even if less than all the chuck jaw teeth are engaged with the fastener, the radial support provided by boss 89 prevents the jaws from radially collapsing or pivoting radially inwardly along the jaw skirt 77.

Once the head 6 of the pin 5 engages the back surface 102 of workpiece panel 106 (FIG. 5), the tool piston may be powered in reverse to produce a very small reaction force against the pintail 3 which results in the anvil 45 retracting from the workpieces 106, 108 as shown in FIG. 6. At this point, the front face 105 of the collet 45 directly confronts the inside face 67 of the anvil so as to allow the chuck jaws 63 to expand radially outwardly under the radially camming or wedging action discussed above. In this position, the nose assembly 35 may be freely removed from the pintail 3 and freely positioned over another fastener to repeat the pulling operation.

Once the pin 5 is pulled through the interference hole 109 and nose assembly 35 released, a collar 19 may be placed over the pin and swaged in place with a nose assembly such as shown in FIG. 1.

Obviously numerous modifications and variations of the present invention are possible in light of the above teachings. It is therefore to be understood that within the scope of the appended claims, the invention may be practiced otherwise than as specifically described herein.

What is claimed is:

1. A nose assembly for quietly pulling a fastener pin having a short shank formed with ridges and grooves through a workpiece so as to form an interference fit between said pin and said workpiece, said assembly comprising:

a housing operatively associated with said housing, a collet operatively associated with said housing, jaw means comprising a front axial portion formed with a plurality of teeth for engaging and mating with said ridges and grooves formed on said fastener pin, said jaw means being disposed within said collet, said front axial portion dimensioned to project outwardly from said collet during said pulling to facilitate gripping of said short shank, said jaw means further comprising a rear axial portion defining an axially extending recess bounded by an inner wall; and jaw support means for radially supporting said rear axial portion of said jaw means against radially inwardly directed pivoting movement caused by forces generated between said front axial portion of said jaw means and said pin shank as said front axial portion of said jaw means projects from said collet during said pulling, said jaw support means comprising an axial projection fitted within said recess with a clearance fit prior to said pulling to allow said jaw means to be freely positioned over said pin shank, said collet forcing said rear axial portion of said jaw means into engagement with said axial projection during said pulling such that said axial projection prevents said pivoting movement of said rear axial portion of said jaw means and prevents said jaw means from being pulled out of said collet.

2. The assembly of claim 1, wherein said inner wall comprises a cylindrical wall and wherein said axial projection comprises a cylindrical boss having a contour which compliments and is engageable with said cylindrical wall.

3. The assembly of claim 1, wherein said rear axial portion of said jaw support means comprises a radially outwardly diverging conical rear face and wherein said jaw support means further comprises a conical face which compliments and is engageable with said conical rear face of said jaw support means.

4. The assembly of claim 3, wherein said axial projection extends axially forwardly from said conical face of said jaw support means.

* * * * *

UNITED STATES PATENT AND TRADEMARK OFFICE
CERTIFICATE OF CORRECTION

PATENT NO. : 4,989,442

DATED : February 5, 1991

INVENTOR(S) : Hendrik E. Rosier

It is certified that error appears in the above-identified patent and that said Letters Patent is hereby corrected as shown below:

Abstract, line 4, "includes" should read -- include --

Column 2, line 9, "Jstringer" should read -- J-stringer --

Column 3, line 57, "reward" should read -- rearward --

Column 7, claim 1, line 11, "a housing operatively associated with said housing," should read -- a housing having an anvil for abutting a workpiece, --

Column 8, claim 3, line 18, "jaw support means" should read -- jaw means --

Column 8, claim 3, line 22 "jaw support means" should read -- jaw means --

Signed and Sealed this

Seventh Day of July, 1992

*Attest:*

DOUGLAS B. COMER

*Attesting Officer*     *Acting Commissioner of Patents and Trademarks*